United States Patent [19]

Rietsch

[11] Patent Number: 4,800,769
[45] Date of Patent: Jan. 31, 1989

[54] TRANSMISSION DUAL IDLER REVERSE DRIVE MECHANISM

[75] Inventor: Donald R. Rietsch, Howell, Mich.

[73] Assignee: Ford Motor Company, Dearborn, Mich.

[21] Appl. No.: 52,511

[22] Filed: May 21, 1987

[51] Int. Cl.⁴ .............................................. F16H 3/08
[52] U.S. Cl. ....................................... 74/322; 74/333; 74/342
[58] Field of Search ................. 74/320, 321, 322, 325, 74/333, 359, 356, 323, 342, 329, 339

[56] References Cited

U.S. PATENT DOCUMENTS

| | | | |
|---|---|---|---|
| 1,731,151 | 10/1929 | Royce | 74/325 |
| 2,096,304 | 10/1937 | Lapsley | 74/325 |
| 2,192,078 | 7/1937 | Hautzenroeder | 74/333 |
| 2,227,742 | 1/1941 | Backus | 74/333 |
| 2,290,821 | 7/1942 | Backus | 74/333 |
| 2,311,201 | 2/1943 | Backus | 74/333 |
| 2,328,104 | 8/1943 | Simpson | 74/333 |
| 2,379,021 | 6/1945 | Marchak | 74/333 |
| 2,572,480 | 10/1951 | Hoffman | 74/333 |
| 2,784,609 | 3/1957 | Panhard | 74/359 |
| 3,247,738 | 4/1966 | Schall | 74/359 |
| 4,627,301 | 12/1986 | Bainbridge et al. | 74/359 |
| 4,640,146 | 2/1987 | Buback | 74/333 |

Primary Examiner—Leslie A. Braun
Assistant Examiner—Dwight G. Diehl
Attorney, Agent, or Firm—Frank G. McKenzie; Donald J. Harrington

[57] ABSTRACT

A manually operated automotive transmission includes an input cluster shaft that carries a reverse input pinion, a countershaft rotatably mounted parallel to the input shaft, a synchronizer clutch including a clutch sleeve defining reverse output gear slidably mounted on the cluster shaft and continually drivable connected to the countershaft, a reverse idler shaft, a first slidable reverse idler continually in meshing engagement with the reverse pinion, a second fixed idler pinion continually engaged with the reverse output gear. The reverse idlers are rotatably mounted on the idler shaft and define clutch teeth, which are brought into engagement as the slidable idler is moved by the vehicle operator to the reverse drive position and are disengaged as the vehicle operator selects forward drive ratios and the neutral position.

10 Claims, 1 Drawing Sheet

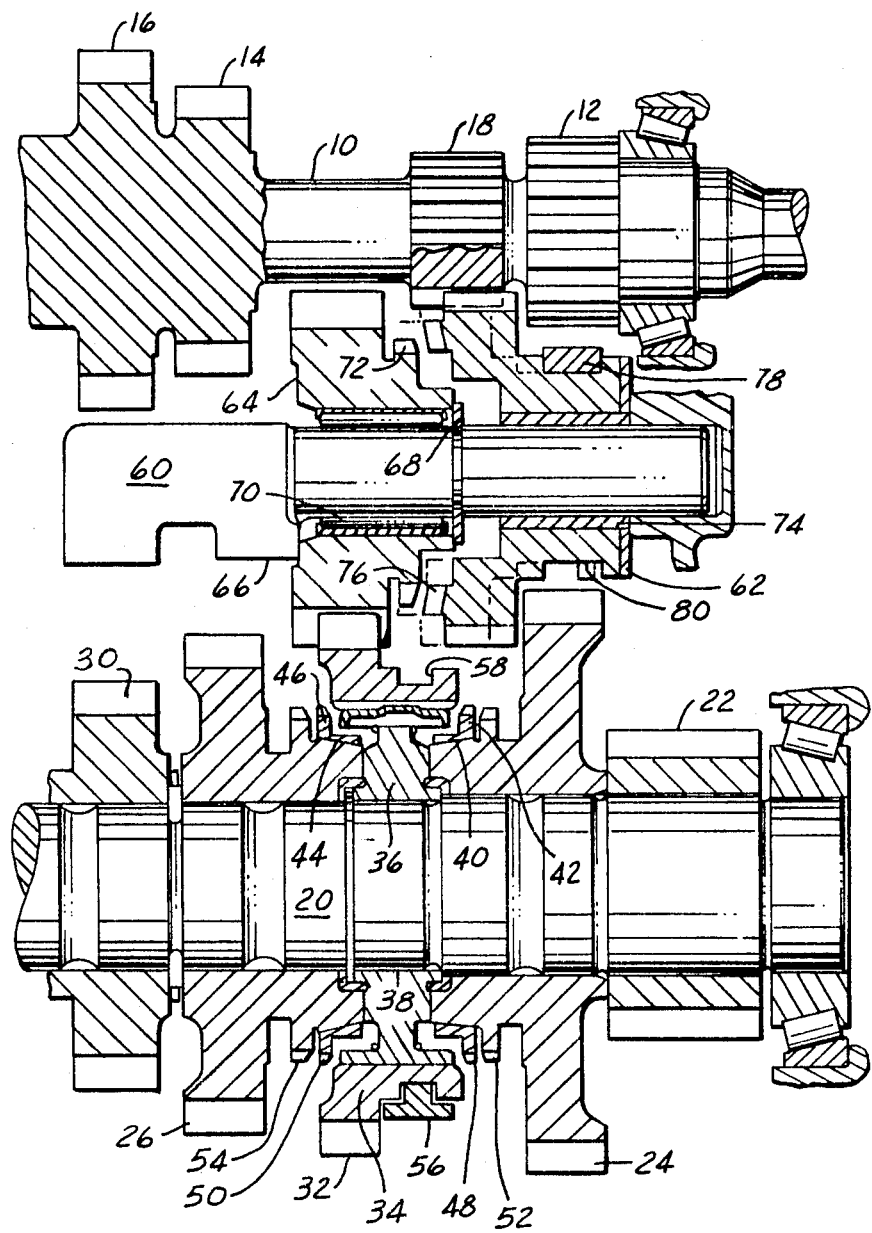

TRANSMISSION DUAL IDLER REVERSE DRIVE MECHANISM

BACKGROUND OF THE INVENTION

1. Field of the Invention

The invention relates generally to manually oPerated automotive vehicle transmissions, more particularly, to a transaxle mechanism and especially to the reverse drive mechanism of a transaxle.

2. Description of the Prior Art

The reverse drive mechanism of a conventional manual transaxle includes an input shaft that carries a reverse input pinion, a reverse idler rotatably supported and slidably mounted on a reverse idler shaft, and a countershaft rotatably supporting a reverse output gear. When reverse drive operation is selected manually by the vehicle operator, his movement of the gear selector lever causes a reverse bell crank to rotate about its pivot, thereby sliding the reverse idler into engagement with the reverse input pinion and with the reverse output gear.

Generally, either the reverse input pinion or reverse output gear is formed on the periphery of a synchronizer clutch sleeve, which is moved by the vehicle operator among adjacent forward drive positions and a neutral position. When the synchronizer is in the neutral position, the reverse output gear is aligned for engagement by the reverse idler. The synchronizer clutch sleeve is formed with spline teeth on its inside surface. The clutch hub, which is fixed to the countershaft, is formed with spline teeth that are continually engaged with the spline teeth of the clutch sleeve.

The end face of the sliding idler gear, which first engages the reverse input pinion and reverse output gear, is inclined away from the gear wheels that it engages to facilitate the engagement. However, the gear teeth formed on the reverse pinion idler and reverse output gear are spur gears. Frequently, the face of the idler gear becomes damaged when a gear ratio change to the reverse drive ratio is attempted while there is relative rotation between the gear wheel and the idler. Furthermore, the gear teeth that form the torque delivery path for the reverse drive are relatively coarse in comparison to the fine teeth formed on the gear wheels and synchronizer sleeve that produce the synchronized engagement of the other gear ratios. If the gear teeth of the idler and the reverse gear wheels are not aligned, damage results in the form of flats formed on the end face of the idler when the reverse bell crank is forced by the vehicle operator to the reverse drive position. In the conventional reverse drive gear mechanism, the axis of the reverse pinion is eccentric of the axis of the reverse idler; and the axis of the reverse output gear is eccentric of the axis of the reverse idler. All of these factors contribute to the likelihood of the gear teeth crossing when reverse drive engagement is attempted while the gear teeth to be engaged are nonaligned prior to engagement.

SUMMARY OF THE INVENTION

The difficulty in shifting to reverse drive operation, particularly the effort required by the vehicle operator to complete the engagement of the reverse drive gear mechanism, can be overcome with a mechanism of this invention.

The reverse idler shaft according to this invention supports two reverse idlers, a first idler having gear teeth continually meshing with the reverse input gear teeth and the second idler fixed in position on the idler shaft having gear teeth in continual meshing engagement with the reverse output gear. Both of the reverse idlers carry clutch teeth that are brought into engagement when the first idler slides on the idler shaft toward the second idler, whose axial position on the shaft remains fixed. The clutch teeth become disengaged when the vehicle oPerator selects forward drive. Then the axially displaceable reverse idler moves alonq the shaft away from the second idler, thereby disengaging the clutching teeth on the idler gear wheels.

In this device, the centers of the first and second reverse idlers are coaxial and the pitch of the clutching teeth are finer than the gear teeth of the components of the reverse torque delivery path. The distance the reverse idler is moved along the idler shaft by the vehicle operator to produce reverse drive is reduced to less than a third of the distance the reverse idler is moved to produce reverse drive in a conventional mechanism.

The device according to this invention includes an input shaft that carries at least a reverse input gear, a countershaft rotatably supporting multiple output gears including the reverse output gear, and a reverse idler shaft rotatably supporting first and second reverse idlers. The first reverse idler is in continuous meshing engagement with the reverse input gear and is mounted on its shaft for sliding movement toward the second reverse idler. The reverse output gear is in continuous meshing engagement with the second reverse idler. The first and second idlers define a system of fine, axially directed clutch teeth adapted to become drivably connected when the first reverse idler is moved by the vehicle operator toward the second reverse idler and to become disengaged when the reverse idler is moved away from the first idler. The pitch diameter of the gear teeth formed on the first and second reverse idlers are coaxial and their clutching teeth are directed substantially parallel to the axis of the idler shaft. Either the reverse input pinion or the reverse output gear is formed on the periphery of a synchronizer clutch sleeve whose hub is fixed to the associated shaft, the sleeve being held in continuously meshing engagement with the hub.

BRIEF DESCRIPTION OF THE DRAWINGS

The FIGURE is a cross section through the input shaft, output shaft and reverse idler shaft of a manual transmission.

DESCRIPTION OF THE PREFERRED EMBODIMENT

Referring first to FIG. 1, an input shaft 10 is journalled on bearings mounted in the support walls of the transmission housing. Formed on or fixed to the input shaft are input pinions 12, 14, 16, 18. These pinions are a part of the torque delivery path during operation in low speed ratio, second speed ratio, third speed ratio and reverse drive, respectively. A countershaft 20 is rotatably supported on bearings fitted within the transmission housing. The torque output gear 22 is fixed to or integrally formed with the countershaft and meshes with an output gear that drives a differential gear assembly such as that described in U.S. Pat. No. 4,377,093, the entire disclosure of which is incorporated herein by reference. The countershaft supports output gears 24, 26, 30, each of which forms a part of the torque delivery paths for low speed ratio drive, second speed ratio drive and third speed ratio drive, respectively. The output gears are journalled on the outer surface of countershaft 20.

A reverse output gear 32 is formed integrally with the collar 34 of a synchronizer clutch whose hub 36 is splined at 38 to the countershaft. Sleeve 34 has spline teeth formed on its inner surface continually in mesh with spline teeth formed on the outer surface of hub 36 so that the sleeve can be moved parallel to the axis of the countershaft.

Output gear 24 defines a conical surface 40 on which synchronizer ring 42 is mounted, and output gear 26 defines a conical surface 44 on which synchronizer ring 46 is mounted. The synchronizer rings have dog teeth 48, 50 on their periphery aligned with clutching teeth 52, 54 formed integrally with output gears 24, 26. As the synchronizer sleeve 34 is moved parallel to the axis of countershaft 20, the internal spline teeth on the sleeve remain engaged with the external spline teeth on the outer surface of the hub 36. When sleeve 34 is moved rightward, its spline teeth first engage dog teeth 48 and force synchronizer ring 42 against conical surface 40, thereby synchronizing the speed of countershaft 20 with that of output gear 24. After synchronism is attained, sleeve 34 is moved further rightward into engagement with clutching teeth 52 to complete the first or low speed ratio engagement.

Second speed ratio is engaged when synchronizer sleeve 34 is moved leftward to engage dog teeth 50 and to force synchronizer ring 46 against conical surface 44. When the speed of output gear 26 is synchronized with the speed of countershaft 20, sleeve 34 is moved further leftward so that its internal spline teeth engage clutching teeth 54, thereby completing the second speed ratio engagement.

A shift fork 56 slidably mounted on a shift rail aligned parallel to the axis of countershaft 20 has fingers fitted within a recess in sleeve 34. As the vehicle operator moves the gear selector lever between first speed ratio and second speed ratio positions, shift fork 56 moves rightward and leftward from the neutral position shown in the figure.

A reverse idler shaft 60 is supported at each end on the transmission casing and carries a first, sliding reverse idler 62 and a second, stationary reverse idler 64. Idler 62 is continually in meshing engagement with the reverse input pinion 18 and stationary idler 64 is in continual meshing engagement with reverse output gear 32, formed on the periphery of synchronizer sleeve 34. Idler 64 has one end face abutting a shoulder 66 and is held in its axial position by a snap ring 68 fitted within an annular groove formed on the surface of the idler shaft. A needle bearing 70 rotatably supports the stationary idler for rotation with respect to the idler shaft. Clutch teeth 72 are formed on the stationary idler wheel near the end face adjacent the sliding reverse idler 62.

A bushing 74 fitted over the surface of the idler shaft rotatably supports the sliding idler wheel for rotation with respect to the shaft 60. A system of clutch teeth 76 formed on the end face of the sliding idler wheel adjacent clutching teeth 72 is adapted for driving engagement with and releasable connection to clutching teeth 72 as the sliding idler is moved along the axis of the idler shaft. A reverse bell crank 78 is pivotably mounted on the transmission casing and includes a portion fitted within a recess 80 formed on the reverse idler wheel. When the vehicle operator selects reverse drive operation, the bell crank pivots in accordance with the motion of the gear selector lever, causes the reverse sliding idler 62 to move leftward, thereby bringing clutch teeth 72 and 76 into engagement.

The torque delivery path for reverse drive operation includes input shaft 10, reverse pinion 18, reverse idler 62, clutch teeth 72, 76, reverse idler 64, reverse output gear 32, synchronizer hub 36, countershaft 20, and output pinion 22.

Pinion 22 is in continuous meshing engagement with final drive output gear which is connected mechanically to the input of the differential mechanism through which torque and power are transmitted to the drive wheels of the vehicle through axial shafts rotatably mounted substantially parallel to the input shaft and countershaft.

Having described the preferred embodiment of my invention, what I claim and desire to secure by U.S. Letters Patent is:

1. A reverse drive mechanism for a transmission comprising:
   a reverse pinion;
   a first reverse idler slidably mounted and continually meshing with the reverse pinion, having first clutching means;
   a reverse output gear; and
   a second reverse idler continually meshing with the reverse output gear, having second clutching means for releasable connection to the first clutching means.

2. The mechanism of claim 1 wherein the first and second reverse idlers are coaxially rotatably mounted.

3. The mechanism of claim 1 wherein the reverse pinion is rotatably supported on a cluster shaft, the reverse output gear is rotatably supported on a countershaft, and further comprising multiple meshing pairs of gears and pinions supported on the cluster shaft and output shaft.

4. The mechanism of claim 1 further comprising:
   a cluster shaft adapted for driveable connection to an engine, having the reverse pinion fixed thereto;
   a reverse idler shaft rotatably supporting the first and second reverse idlers thereon; and
   a countershaft rotatably supporting the reverse output gear thereon.

5. The mechanism of claim 1 further comprising a synchronizer clutch having a hub and a sleeve mounted on the hub for rotation therewith, the sleeve slidable relative to the hub and defining at its periphery the reverse output gear.

6. The mechanism of claim 1 wherein:
   the first reverse idler includes a gear wheel having gear teeth formed on the periphery of the gear wheel, a surface located radially inward from the gear teeth on which surface the gear wheel is rotatably supported and slidably mounted, and the first clutch means includes angularly spaced clutch teeth directed substantially parallel to the direction of the slidable movement; and
   the second clutch means includes angularly spaced clutch teeth adapted for engagement with the clutch teeth of the first idler means as the first idler means moves toward the second clutch means and for disengagement as the first clutch means moves away from the second clutch means.

7. A reverse drive mechanism for a transmission comprising:

a cluster shaft having a reverse pinion rotatably mounted thereon;

a countershaft having a reverse output gear rotatably mounted thereon;

a reverse idler shaft having a first idler slidably mounted thereon, continually meshing with the reverse pinion having first clutching means, and a second reverse idler continually meshing with the reverse output gear having second clutching means for releasable connection to the first clutching means.

8. The mechanism of claim 7 wherein the cluster gear includes multiple pinions and the reverse pinion.

9. A reverse drive mechanism for a transmission comprising:

an input shaft having several forward drive pinions and a reverse drive pinion fixed thereto;

a countershaft rotatably mounted parallel to and offset from the axis of the input shaft, having forward drive output gears and a reverse output gear supported thereon, and continually meshing with the forward drive pinions and with the reverse drive pinion, respectively, the reverse drive output gear being driveably fixed to the countershaft;

a reverse idler shaft including a first idler gear slidably mounted thereon, continually meshing with the reverse drive pinion and having first clutching means, and a second reverse idler gear continually meshing with the reverse drive output gear and having second clutching means for effecting a releasable connection to the first clutching means.

10. The mechanism of claim 9 further comprising coupler means for selectively driveably connecting the forward drive output gears to said output shaft and maintaining the reverse drive output gear in mesh continually with the second reverse drive idler gear.

* * * * *